(12) United States Patent
Kumar et al.

(10) Patent No.: US 10,001,045 B2
(45) Date of Patent: Jun. 19, 2018

(54) NON-INTRUSIVE AIR/FUEL SENSOR DIAGNOSTICS

(71) Applicant: Ford Global Technologies, LLC, Dearborn, MI (US)

(72) Inventors: Pankaj Kumar, Dearborn, MI (US); Imad Hassan Makki, Dearborn Heights, MI (US); Dimitar Petrov Filev, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 61 days.

(21) Appl. No.: 15/356,429

(22) Filed: Nov. 18, 2016

(65) Prior Publication Data

US 2018/0142601 A1    May 24, 2018

(51) Int. Cl.
   *F01N 3/10* (2006.01)
   *F01N 9/00* (2006.01)
   *F01N 11/00* (2006.01)
   *F01N 13/00* (2010.01)

(52) U.S. Cl.
   CPC ............. *F01N 9/005* (2013.01); *F01N 3/101* (2013.01); *F01N 11/007* (2013.01); *F01N 13/008* (2013.01); *F01N 2560/025* (2013.01); *F01N 2900/0416* (2013.01)

(58) Field of Classification Search
   CPC ........ F01N 3/101; F01N 9/005; F01N 11/007; F01N 13/008; F01N 2560/025; F01N 2560/14; F01N 2900/0416
   See application file for complete search history.

(56) References Cited

U.S. PATENT DOCUMENTS

| | | | |
|---|---|---|---|
| 5,732,551 | A | 3/1998 | Naber et al. |
| 5,801,295 | A | 9/1998 | Davey et al. |
| 6,904,751 | B2 | 6/2005 | Makki et al. |
| 9,175,625 | B2 | 11/2015 | Kumar et al. |
| 2004/0006973 | A1 | 1/2004 | Makki et al. |
| 2007/0017212 | A1 | 1/2007 | Yamauchi et al. |
| 2009/0182490 | A1* | 7/2009 | Saunders ............ F02D 41/1454 701/114 |
| 2013/0245919 | A1 | 9/2013 | Kumar et al. |
| 2015/0204258 | A1 | 7/2015 | Kumar et al. |
| 2015/0233315 | A1* | 8/2015 | Kumar ................ F02D 41/0295 60/274 |

* cited by examiner

*Primary Examiner* — Audrey K Bradley
(74) *Attorney, Agent, or Firm* — Julia Voutyras; McCoy Russell LLP

(57) ABSTRACT

Methods and systems are provided for diagnosing a fault condition of an exhaust gas oxygen sensor downstream of a catalyst in an exhaust system of a vehicle. In one example, a method may include determining a ratio of a rate of change of a fractional oxidation state of the catalyst to a rate of change of an output voltage of the oxygen sensor. If the ratio is positive, a fault is diagnosed and subsequent adjustment of engine operation does not take into account feedback from the oxygen sensor.

20 Claims, 8 Drawing Sheets

(12)  US 10,001,045 B2

NON-INTRUSIVE AIR/FUEL SENSOR DIAGNOSTICS

FIELD

The present description relates generally to diagnosing degradation of an exhaust gas sensor in a motor vehicle.

BACKGROUND/SUMMARY

With tightening government regulations on automobile emissions, modern vehicles use a three-way catalyst (TWC) for engine exhaust after-treatment. Ceria is commonly added to the catalyst to chemically store oxygen and help curb emissions breakthrough by increasing the operating window about the stoichiometric air-to-fuel ratio (AFR). The TWC may be maintained at a desired fractional oxidation state (FOS) based on catalyst monitor sensors and/or physics-based catalyst models. For example, some vehicles have a universal exhaust gas oxygen (UEGO) sensor upstream of the TWC and a heated exhaust gas oxygen (HEGO) sensor downstream of the TWC to help maintain the AFR and the FOS of the catalyst at set points. Specifically, the upstream UEGO sensor provides feedback to adjust engine exhaust gases about stoichiometry. The downstream HEGO sensor provides feedback to bias the engine AFR richer or leaner to increase catalyst efficiency. Furthermore, the downstream HEGO sensor may be used for catalyst diagnostics.

Degradation of the HEGO sensor may lead to increased fuel consumption and emissions. One existing intrusive approach for diagnosing HEGO sensor degradation involves actively adjusting engine operation in order to collect data on HEGO sensor performance. For example, engine operation may be actively adjusted to effect one or more rich-to-lean or lean-to-rich transitions, in order to monitor the response of the HEGO sensor to these transitions. Another existing approach, which is non-intrusive, is disclosed in U.S. Pat. No. 5,801,295. Therein, HEGO sensor output voltage is monitored when certain entry conditions are met, and voltage trace segments are summed over a specified period. The length of the summed HEGO voltage trace is compared to a threshold length; a trace length below than the threshold length indicates decreased sensitivity and robustness of the HEGO sensor.

However, the inventors herein have recognized potential issues with such approaches. For example, in the intrusive approach, the required excursions from normal engine operation may be restricted to particular operating conditions that do not occur frequently enough to accurately monitor the sensor. Further, these excursions may increase the duration of engine operation at non-desired AFRs, resulting in increased fuel consumption and/or increased emissions. In the non-intrusive approach, in order to perform the diagnosis, various entry conditions must be met, such that HEGO sensor degradation may remain undetected for an excessive period of time during which it negatively affects engine performance. In addition, as this approach associates decreased frequency of switching alone with HEGO sensor degradation, types of HEGO sensor degradation which do not affect the frequency of switching may go unnoticed.

The inventors herein have identified methods and systems which overcome the deficiencies of the approaches described above. In one example, the issues described above may be addressed by a method for determining a rate of change of a FOS of an exhaust catalyst and a rate of change of an output voltage of an oxygen sensor arranged downstream of the catalyst. If a ratio of the rate of change of the FOS to the rate of change of the output voltage is positive, the method includes indicating an oxygen sensor fault and controlling engine operation independent of the oxygen sensor output voltage. Accordingly, a fault diagnosis of the HEGO sensor may be performed any time the engine is warmed up and operating in steady-state, in contrast to the intrusive approach described above in which the diagnosis can only be performed during certain engine operating conditions which do not occur frequently and often must be actively induced. Further, the methods and systems described in the present disclosure provide for an exceptionally robust diagnosis as they do not take into account the magnitudes of the parameters in question (e.g., the magnitude of the FOS and the magnitude of the HEGO sensor output voltage), but rather focus on the sign of the ratio of the rate of change of the FOS to the rate of change of the HEGO sensor output voltage. Thus, the technical effect of the methods and systems described herein is that a robust HEGO sensor fault diagnosis may be performed by monitoring the sign of the ratio of the rate of change of the FOS to the rate of change of the HEGO sensor output voltage.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
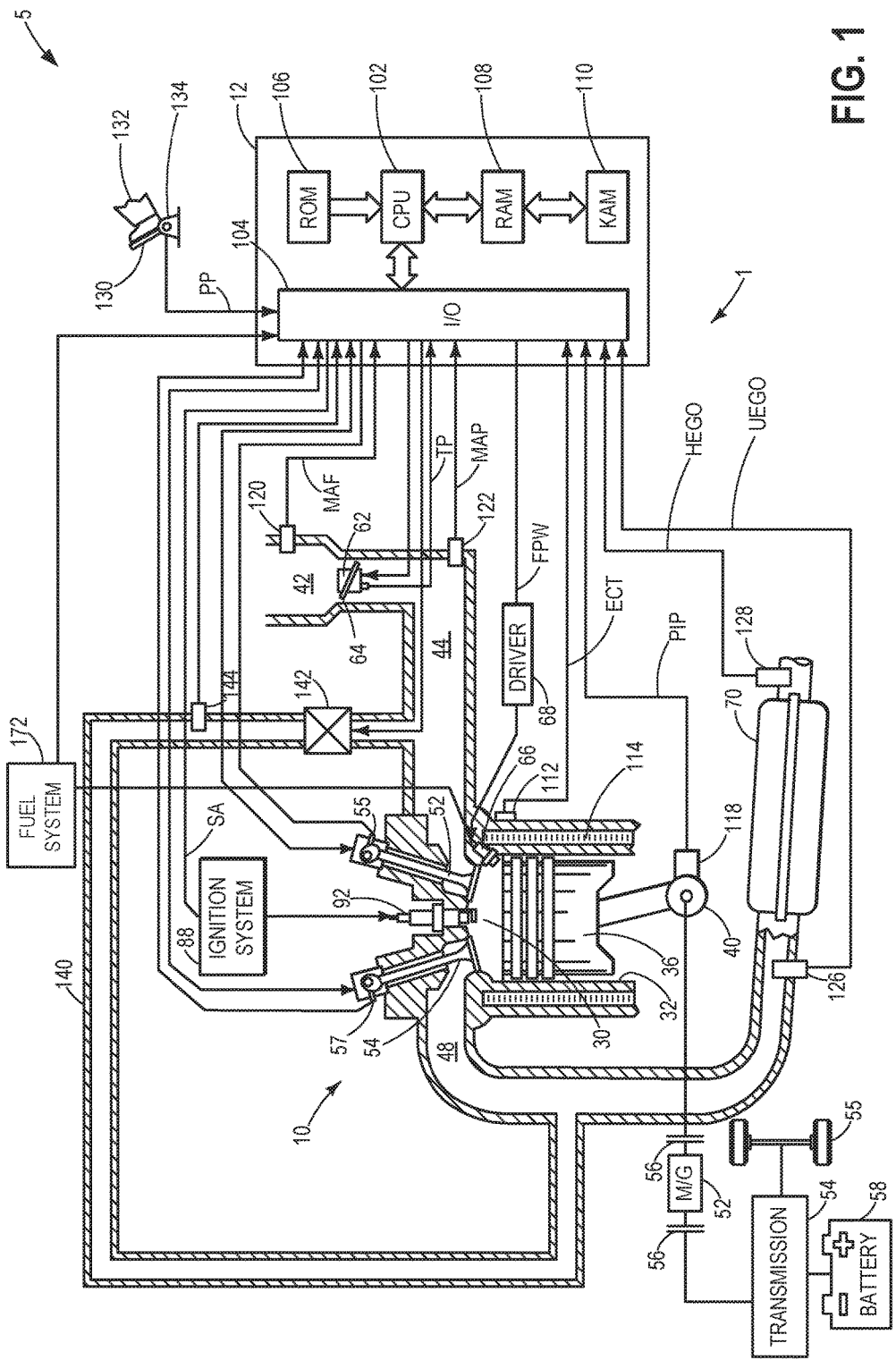
FIG. 1 shows a schematic depiction of an engine and an associated exhaust emissions system of a vehicle.
Figure 2A:
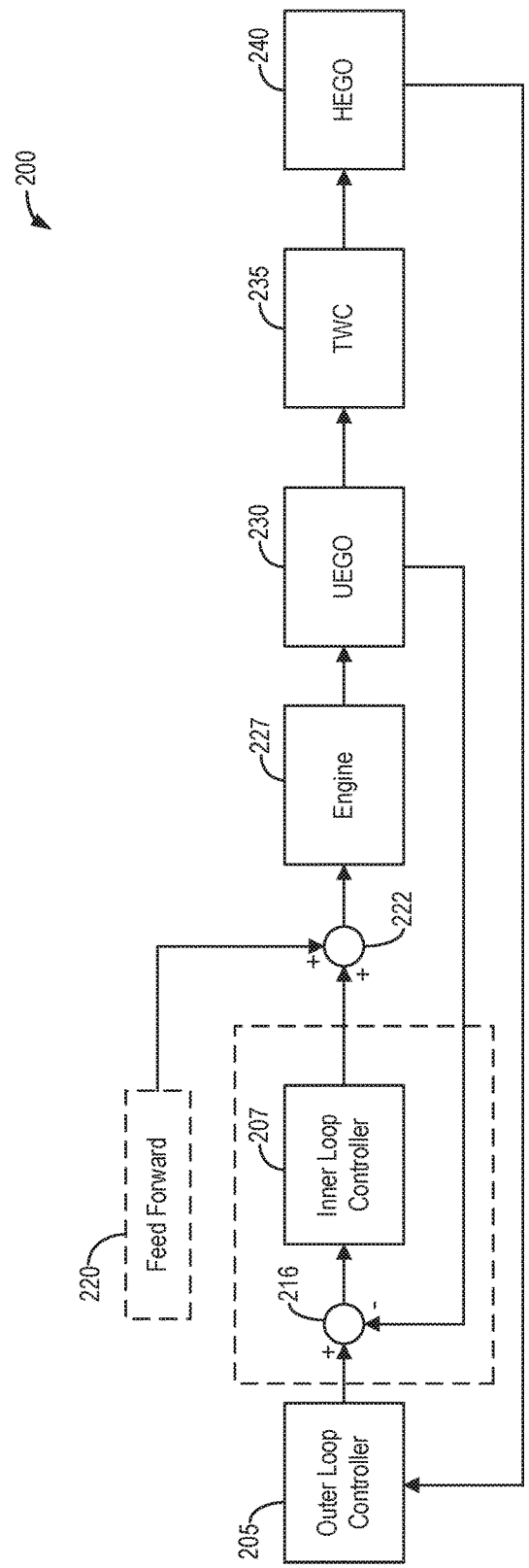
FIG. 2A shows a block diagram illustrating an example control architecture.
Figures 4A, 4B:
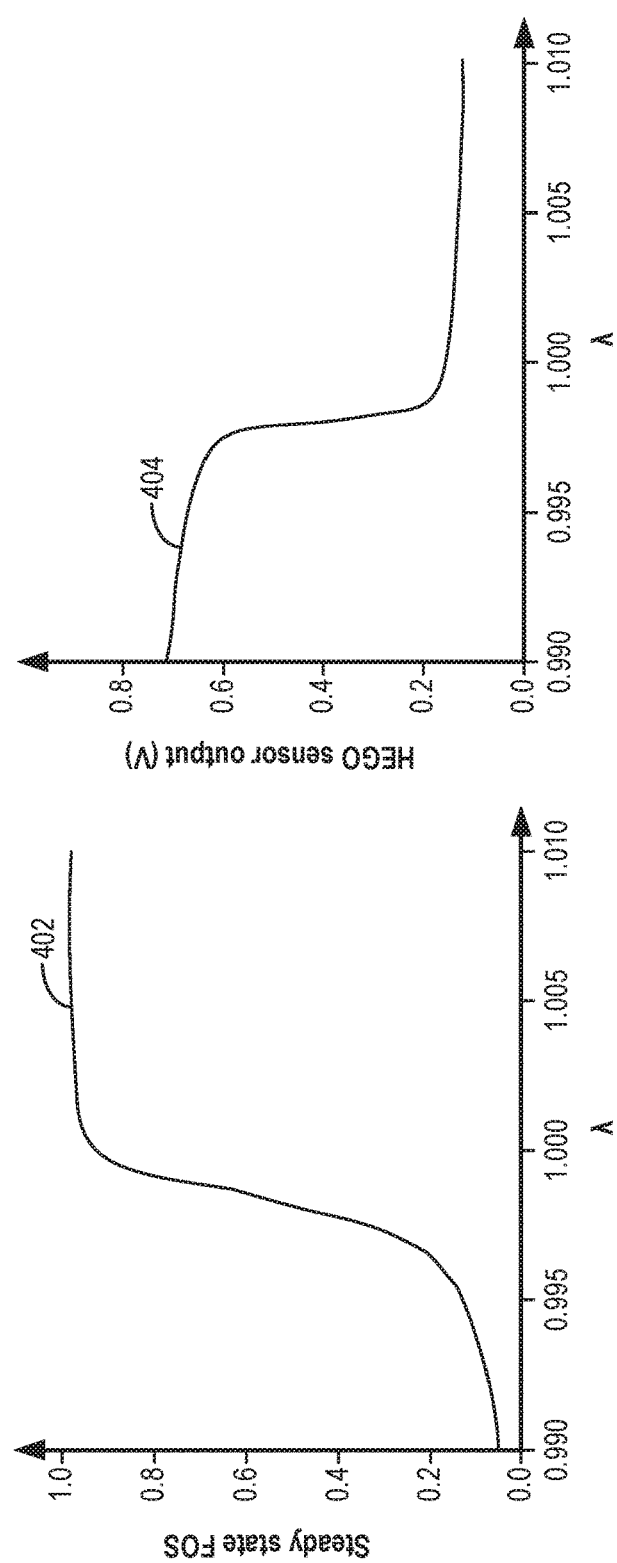
FIG. 4A shows a graph illustrating the FOS of the catalyst as a function of the AFR.
FIG. 4B shows a graph illustrating the relationship between the AFR and the downstream HEGO sensor output voltage.
Figure 5:
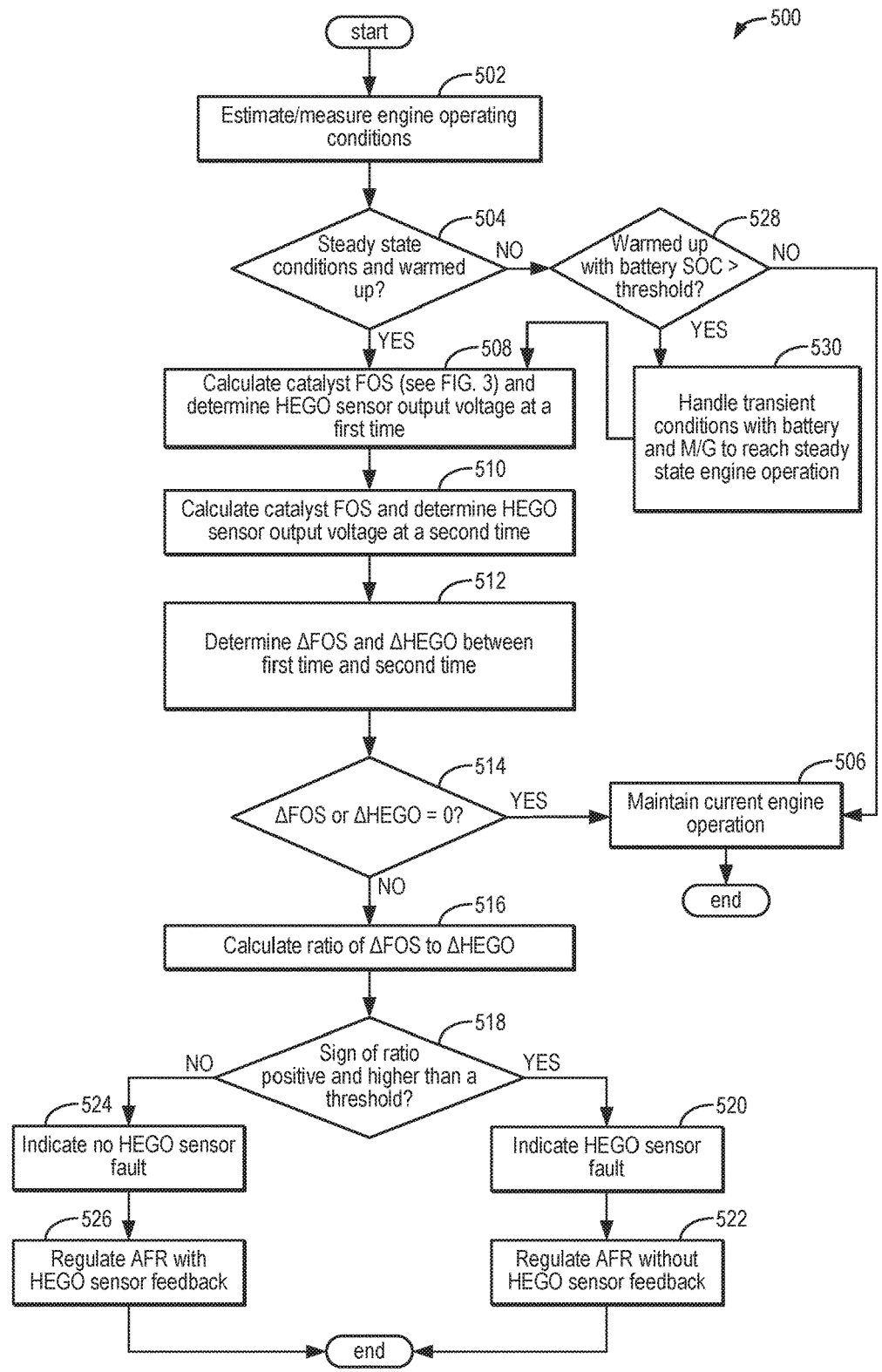
FIG. 5 shows an example flow chart illustrating a method for non-intrusively diagnosing a HEGO sensor fault based on the sign of the ratio of the change in the FOS of the catalyst to the change in HEGO sensor output voltage.
Figure 6:
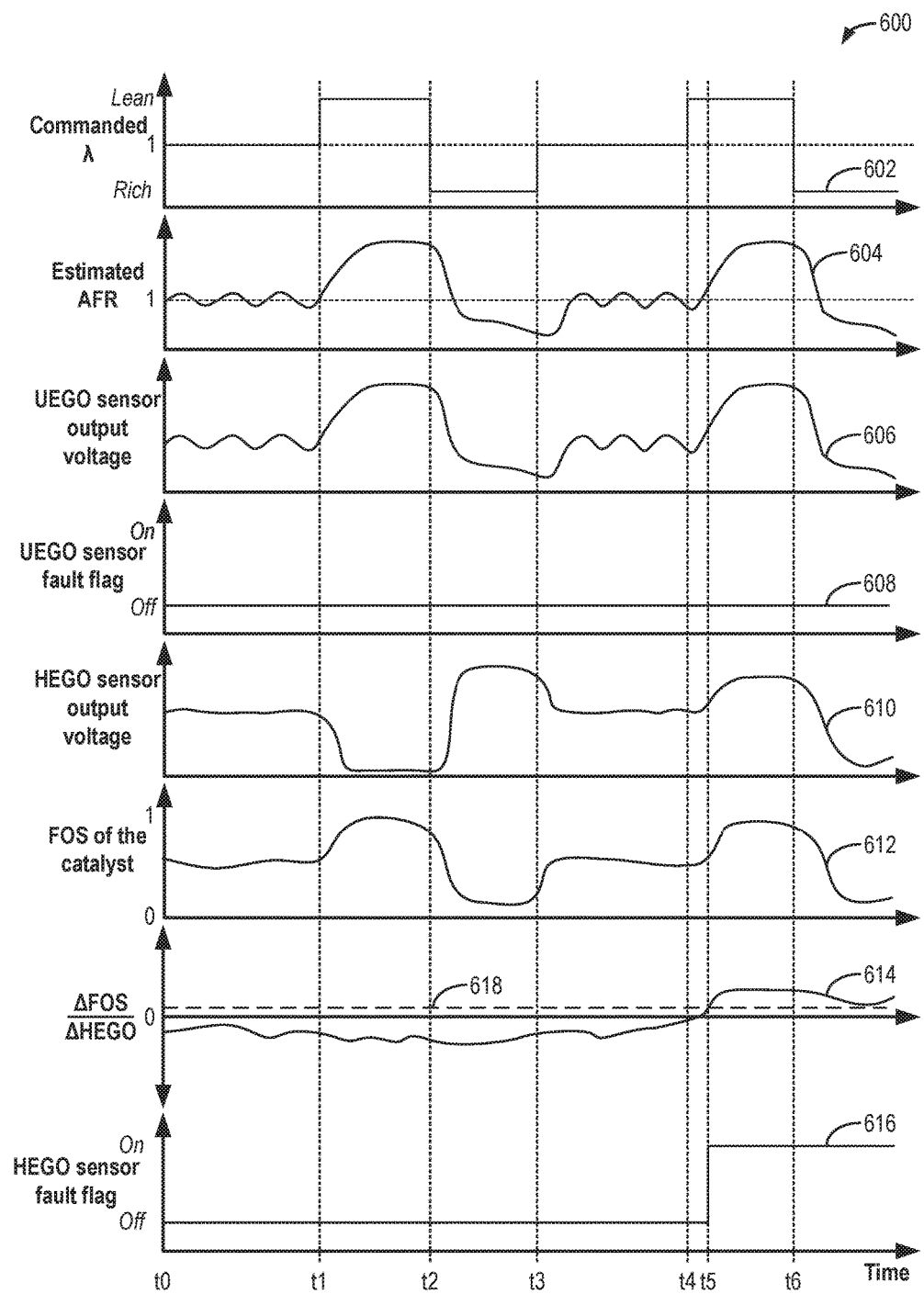
FIGS. 6-7 show example timing diagrams demonstrating HEGO sensor fault detection according to the method of FIG. 5.
Figure 7:
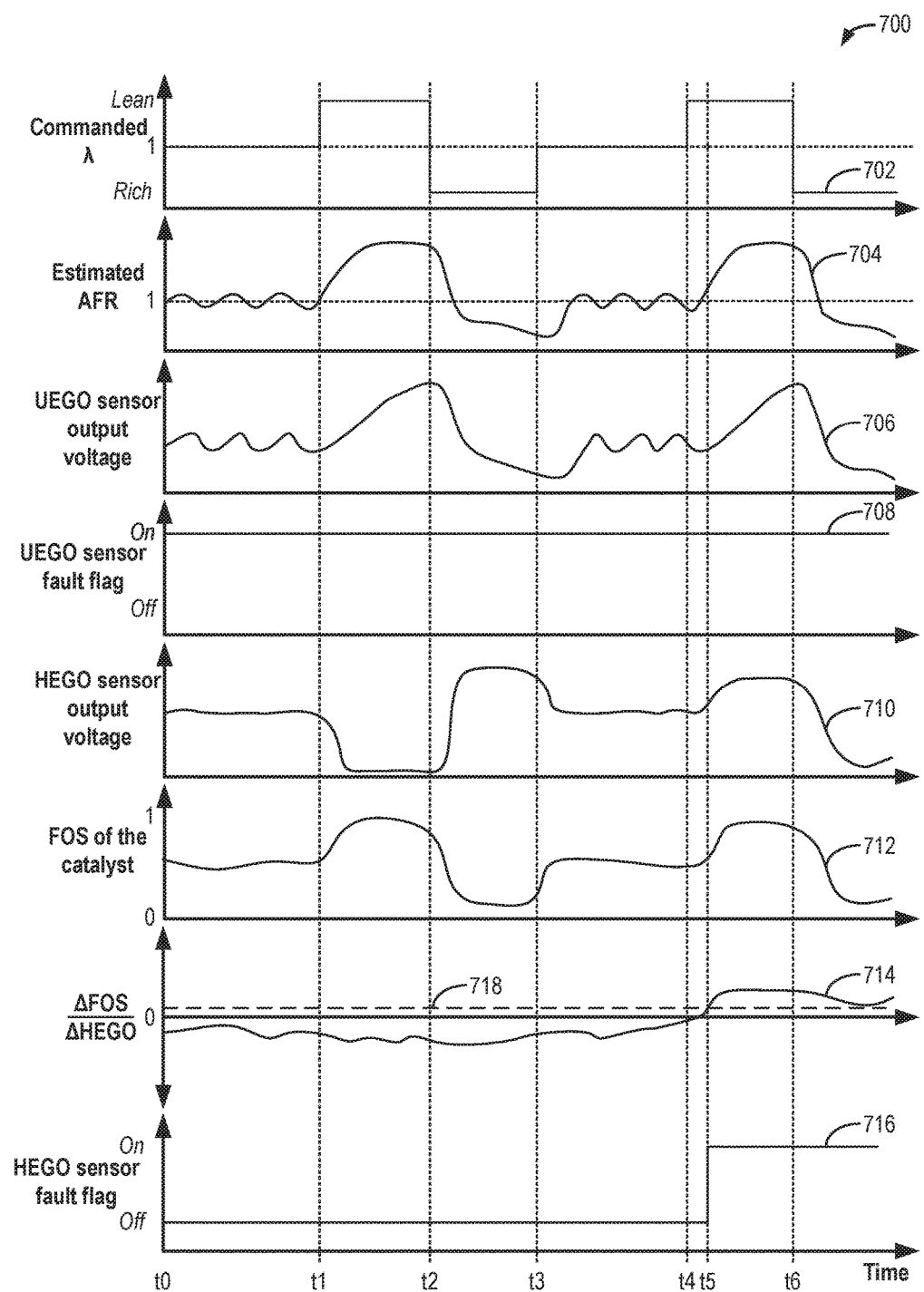

The following description relates to systems and methods for non-intrusively diagnosing HEGO sensor degradation in a vehicle. As shown in FIG. 1, the vehicle may be configured with a TWC for exhaust after-treatment in addition to exhaust gas oxygen sensors upstream and downstream of the catalyst. Engine operation may be controlled based on feedback from these exhaust gas oxygen sensors, as shown in FIG. 2A, in order to achieve a desired AFR and minimize undesirable exhaust emissions. In accordance with the method shown in FIG. 3, the FOS of the catalyst may be calculated at an engine controller via physics-based engine and catalyst models such as those shown in FIG. 2B, and maintained at a set point. The relationship between the AFR and the FOS of the catalyst is shown in FIG. 4A, and the relationship between the AFR and the output of the downstream HEGO sensor is shown in FIG. 4B. As shown in FIG. 5, a controller may indicate HEGO sensor degradation based on the sign of the ratio of the change in the FOS of the catalyst over a duration to the change in HEGO sensor output voltage over the duration. FIG. 6 shows an example of HEGO sensor diagnostics performed when the UEGO sensor is functioning properly, and FIG. 7 shows an example of HEGO sensor diagnostics performed when the UEGO sensor is degraded.

FIG. 1 illustrates a schematic diagram showing one cylinder of multi-cylinder engine 10, which may be included in an engine system 1. Engine system 1 may be a propulsion system included in a motor vehicle 5. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two more exhaust valves. In this example, intake valve 52 and exhaust valve 54 may be controlled by cam actuation via one or more cams and may utilize one or more of cam profile switching (CPS), variable cam timing (VCT), variable valve timing (VVT), and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

In some embodiments, each cylinder of engine 10 may be configured with one or more fuel injectors for providing fuel thereto. As a non-limiting example, cylinder 30 is shown including one fuel injector 66, which is supplied fuel from fuel system 172. Fuel injector 66 is shown coupled directly to cylinder 30 for injecting fuel directly therein in proportion to the pulse width of signal FPW received from controller 12 via electronic driver 68. In this manner, fuel injector 66 provides what is known as direct injection (hereafter also referred to as "DI") of fuel into combustion cylinder 30.

It will be appreciated that in an alternate embodiment, injector 66 may be a port injector providing fuel into the intake port upstream of cylinder 30. It will also be appreciated that cylinder 30 may receive fuel from a plurality of injectors, such as a plurality of port injectors, a plurality of direct injectors, or a combination thereof.

Continuing with FIG. 1, intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

An upstream exhaust gas sensor 126 is shown coupled to exhaust passage 48 upstream of emission control device 70. Upstream sensor 126 may be any suitable sensor for providing an indication of exhaust gas AFR such as a linear wideband oxygen sensor or UEGO; a two-state narrowband oxygen sensor or EGO; a HEGO; or a $NO_R$, HC, or CO sensor. In the non-limiting embodiments described herein, upstream exhaust gas sensor 126 is a UEGO sensor configured to provide output, such as a voltage signal, that is proportional to the amount of oxygen present in the exhaust. Controller 12 uses the output to determine the exhaust gas AFR.

Emission control device 70 is shown arranged along exhaust passage 48 downstream of exhaust gas sensor 126. In the non-limiting embodiments describe herein, device 70 is a TWC configured to reduce $NO_R$ and oxidize CO and unburnt hydrocarbons. In other embodiments, however, device 70 may be a $NO_R$ trap, various other emission control devices, or combinations thereof.

A second, downstream exhaust gas sensor 128 is shown coupled to exhaust passage 48 downstream of emission control device 70. Downstream sensor 128 may be any suitable sensor for providing an indication of exhaust gas AFR such as a UEGO sensor, EGO sensor, HEGO sensor, etc. In the non-limiting embodiments described herein, downstream sensor 128 is a HEGO sensor configured to indicate the relative enrichment or enleanment of the exhaust gas after passing through the catalyst. The HEGO sensor may provide output in the form of a switch point, or the voltage signal at the point at which the exhaust gas switches from lean to rich.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor 144 may be arranged within the EGR passage and may provide an indication of one or more of pressure, temperature, and concentration of the exhaust gas. Under some conditions, the EGR system may be used to regulate the temperature of the air and fuel mixture within the combustion chamber.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10 in addition to those signals previously discussed, including measurement of inducted mass air flow (MAF) from mass air flow sensor 120, engine coolant temperature (ECT) from temperature sensor 112 coupled to cooling sleeve 114, a profile ignition pickup signal (PIP) from Hall effect sensor 118 (or other type) coupled to crankshaft 40, throttle position (TP) from a throttle position sensor, absolute manifold pressure (MAP) signal from sensor 122, UEGO sensor output (UEGO) from UEGO sensor 126, and HEGO sensor output (HEGO) from HEGO sensor 128. An engine speed signal, RPM, may be generated by controller 12 from signal PIP.

Storage medium read-only memory 106 can be programmed with computer readable data representing non-transitory instructions executable by processor 102 for performing the methods described below as well as other variants that are anticipated but not specifically listed.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

As described above, FIG. 1 shows only one cylinder of a multi-cylinder engine, and each cylinder may similarly include its own set of intake/exhaust valves, fuel injector(s), spark plug(s), etc.

FIG. 2A shows a block diagram illustrating a control architecture 200 which may be implemented by an engine controller, such as controller 12 of FIG. 1. Control architecture 200 includes an engine 227, a UEGO sensor 230 upstream of a TWC 235, and a HEGO sensor 240 downstream of TWC 235. Engine 227 may correspond to engine 10 of FIG. 1; UEGO sensor 230 may correspond to UEGO sensor 126 of FIG. 1; TWC 235 may correspond to TWC 70 of FIG. 1; and HEGO sensor 240 may correspond to HEGO sensor 128 of FIG. 1. Catalyst control architecture 200 regulates the engine AFR to a set point near stoichiometry and fine-tunes this regulation based on the deviation of the voltage output of HEGO sensor 240 from a pre-determined HEGO voltage set point. Inner loop controller 207 uses the upstream UEGO sensor output for higher-bandwidth feedback control, while outer loop controller 205 uses the HEGO sensor output for lower-bandwidth control.

Inner loop controller 207, comprising a proportional-integral-derivative (PID) controller, controls the engine AFR by generating an appropriate fuel command (e.g., fuel pulse width). Summing junction 222 optionally combines the fuel command from inner loop controller 207 with commands from a feed-forward controller 220. This combined set of commands is delivered to the fuel injectors of engine 227. UEGO sensor 230 provides a feedback signal to inner loop controller 207. The UEGO feedback signal is proportional to the oxygen content of the feedgas (e.g., engine exhaust) between engine 227 and TWC 235. Outer loop controller 205 generates a UEGO reference signal provided to inner loop controller 207. The UEGO reference signal is combined with the UEGO feedback signal at junction 216. The error or difference signal provided by junction 216 is then used by inner loop controller 207 to adjust the fuel command so that the actual AFR within engine 227 approaches the desired AFR. HEGO sensor 240 provides a feedback signal to the outer loop controller 205. Outer loop controller 205 may be any reasonable controller containing an integral term, such as a proportional-integral (PI) controller.

During normal operation, a catalyst (such as TWC 235 of FIG. 2) produces oxygen ($O_2$) through $NO_x$ reduction. Simultaneously, oxygen is consumed as other exhaust gas species (e.g., HC and CO) are oxidized. Oxygen is also directly available from air in the exhaust gas. If more oxygen is available than consumed, excess oxygen will be stored in the catalyst (for example, in ceria), which can later be used when more oxygen is consumed than generated. The FOS of the catalyst (e.g., the fractional oxidation state of ceria within the catalyst) refers to the amount of stored oxygen in the catalyst at a given time compared to the total oxygen storage capacity and ranges from 0 (no oxygen stored) to 1 (at storage capacity). The FOS of the catalyst may be maintained at a desired level (e.g., 0.5) for optimal performance, the desired level calibrated based on engine load and temperature. In order to control the FOS of the catalyst, physics-based engine and catalyst models may be stored in non-transitory memory of a controller, such as controller 12 of FIG. 1.

Figure 2B:
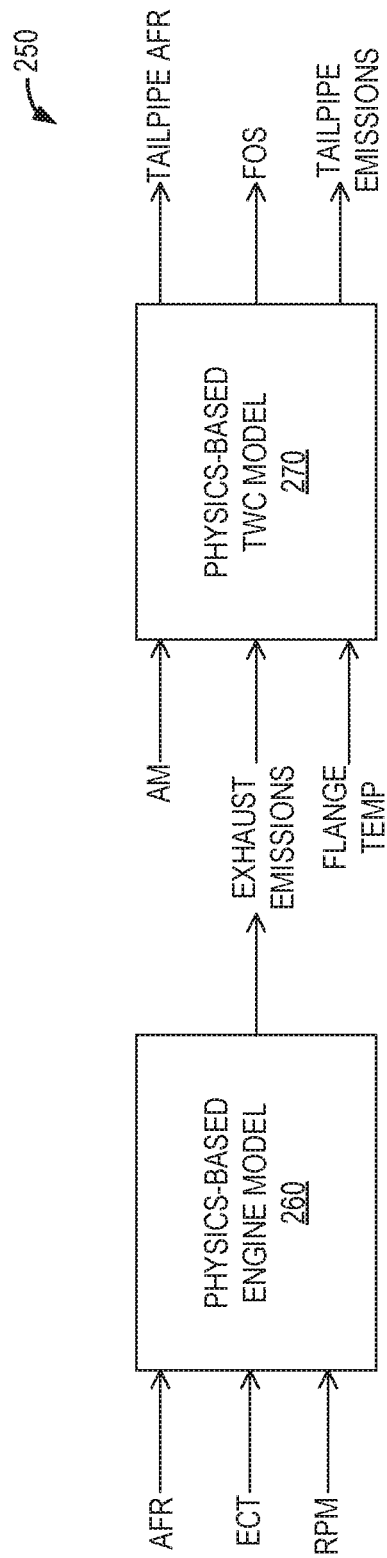
FIG. 2B shows a block diagram illustrating physics-based engine and TWC models.

FIG. 2B shows a block diagram 250 illustrating an exemplary physics-based engine model 260 and an exemplary physics-based TWC model 270. Engine model 260 and TWC model 270 may be stored in non-transitory memory of a controller, such as controller 12 of FIG. 1.

Engine model 260 receives various input parameters. In the depicted example, the input parameters to the engine model include AFR, ECT, and RPM. The AFR value input to the engine model be a signal received from a UEGO sensor such as UEGO sensor 126 of FIG. 1, which represents the sensed AFR of engine exhaust upstream of the TWC. The ECT input may correspond to a sensed ECT value (e.g., from temperature sensor 112 of FIG. 1), or may alternatively be inferred based on measured or inferred values of other parameters. The RPM input may be generated by the controller from the PIP signal, as discussed above with reference to FIG. 1. Engine model 260 includes various equations, such as equations based on physical dynamic models, which receive the input parameters as inputs and produce output parameters which represent estimated engine outputs for the given input parameters. The model may be implemented in the controller in a real-time digital form. In one example, the engine model may be developed using system identification techniques such as an orthogonal least square approach to develop a regression-based exhaust emissions model. In the depicted example, the engine model outputs the estimated exhaust emissions for the given input parameters. The estimated exhaust emissions may be an estimated chemical composition of the exhaust including the concentrations of various exhaust species, for example.

The estimated exhaust emissions in turn serves as one of the input parameters to TWC model 270. TWC model 270 receives various other input parameters; in the depicted example, these include air mass (AM) and flange temperature. The AM parameter represents the mass air flow in the exhaust passage upstream of the TWC, which may be measured by a MAF sensor arranged in the exhaust passage upstream of the TWC. Alternatively, AM may be estimated based on measured or inferred values of other parameters. The flange temperature parameter represents the temperature at the TWC (e.g., the temperature at a flange connecting the exhaust pipe with the TWC), and may be measured by a temperature sensor arranged at the flange, or estimated based on measured or inferred values of other parameters. TWC model 270 includes various functions, equations, and/or control structures which receive the input parameters as inputs and produce output parameters which represent estimated engine outputs for the given input parameters. In the depicted example, the TWC model outputs an estimated tailpipe AFR (e.g., the AFR downstream in the exhaust passage downstream of the TWC), estimated tailpipe emissions (e.g., an estimated chemical composition of the exhaust gas downstream of the TWC), and an estimated FOS of the TWC. The values of these outputs may be stored in non-transitory memory of the controller, and may serve as bases for adjustments to engine system operation enacted by the controller in coordination with various actuators.

Figure 3:
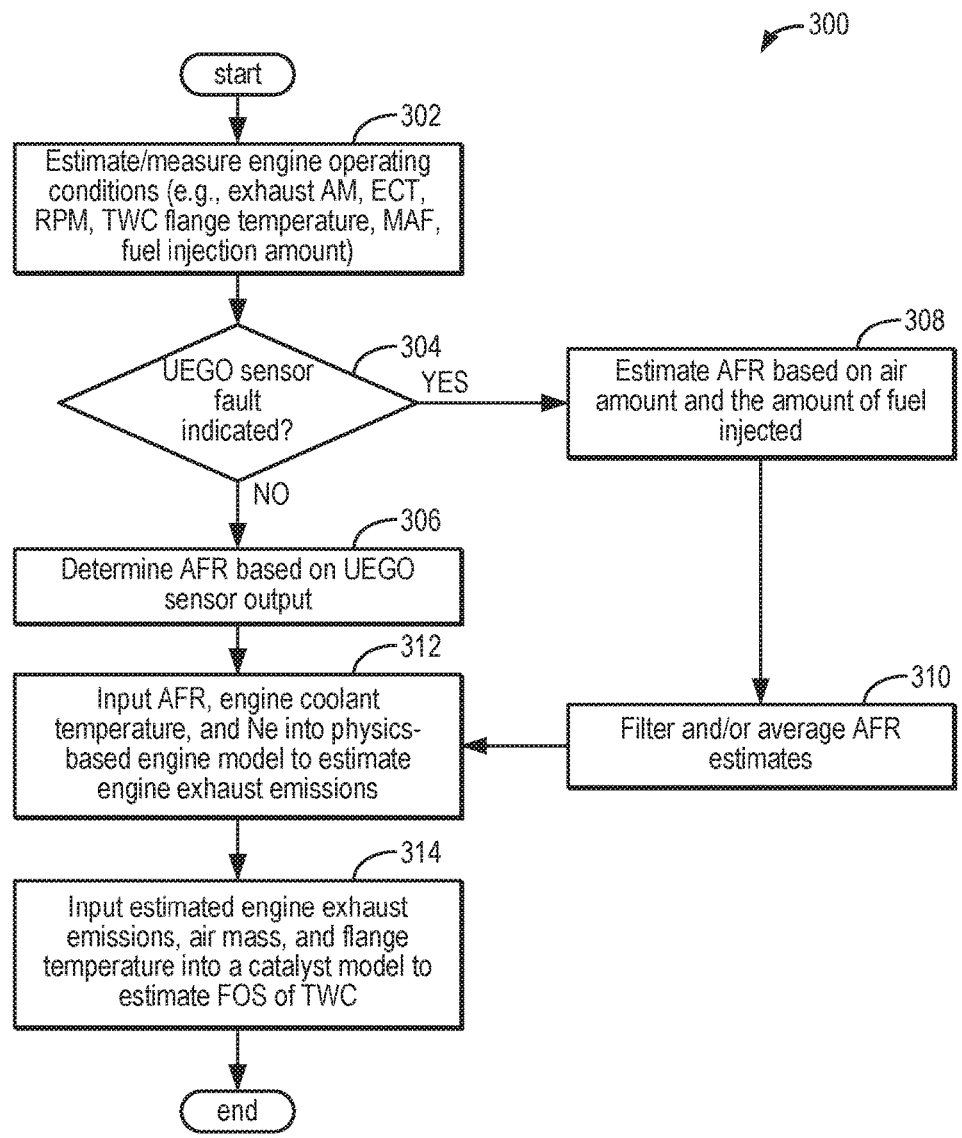
FIG. 3 shows an example flow chart illustrating a method for calculating the FOS of the catalyst using a physics-based TWC model.

FIG. 3 shows an example method 300 for calculating an estimated FOS of the catalyst using physics-based engine and TWC models, such as those shown in FIG. 2B. The estimated FOS may be used to diagnose degradation of the HEGO sensor, as discussed below with reference to the FIG. 5. Instructions for carrying out method 300 and the rest of the methods included herein may be executed by a controller (such as controller 12 of FIG. 1) based on instructions stored in non-transitory memory of the controller and in conjunction with signals received from sensors of the engine system, such as the sensors described above with reference to FIGS. 1 and 2A. The controller may employ various actuators of the engine system to adjust engine system operation according to the methods described herein.

Method 300 begins at 302 and includes estimating or measuring the engine operating conditions. For example, the engine operating conditions may include, but are not limited to, RPM, engine load, ECT, the amount of fuel injected, MAF, engine AFR, UEGO sensor voltage, HEGO sensor voltage, exhaust AM, and TWC flange temperature. The engine operating conditions may be measured by one or more sensors or estimated or inferred based on available data. Following 302, the method proceeds to 304.

At 304, the controller determines whether a UEGO sensor fault is indicated. A UEGO sensor fault may be diagnosed using on-board diagnostics, such as a six-pattern fault method; upon determination that the UEGO sensor is degraded, a UEGO sensor fault flag may be set at the controller, whereas upon determination that the UEGO sensor is not degraded, the UEGO sensor fault flag may not be set, or may be cleared if it was previously set.

If a UEGO sensor fault is not indicated, the method proceeds to 306 and the controller determines the AFR in the exhaust passage upstream of the TWC based on the signal output by the UEGO sensor. As described above with reference to FIG. 1, the signal output by the UEGO sensor may be a voltage which is directly proportional to the concentration of oxygen in the exhaust gas upstream of the TWC. Accordingly, the controller may determine the AFR as a function of, and in proportion to, the signal from the UEGO sensor. Following 306, the method progresses to 314.

Returning to 304, if a UEGO sensor fault is indicated, method 300 proceeds to 308 and the controller estimates the AFR based on the amount of air entering the engine cylinders (MAF) and the amount of fuel injected. The MAF may be measured by a sensor such as MAF sensor 120 of FIG. 1). The amount of fuel injected may be determined based on the fuel injection pulse width commanded by the controller, for example.

After 308, the method proceeds to 310 and the controller filters and/or averages the estimated AFR to increase accuracy. For example, while AFR estimations may be relatively inaccurate due to fuel wall wetting or puddle formation, performing filtering and/or averaging may improve the robustness of an estimation of AFR.

After 310, the method proceeds to 312 and the controller inputs the AFR (either the AFR measured by the UEGO sensor at 306 or the AFR filtered and/or averaged at 310), along with the estimated/measured values of ECT and RPM, into a physics-based engine model, such as engine model 260 of FIG. 2B, to estimate engine exhaust emissions. For example, the engine model may estimate the concentration of exhaust gas species traveling from the engine through the exhaust passage and into the catalyst. After 312, the method proceeds to 314.

At 314, the controller inputs the estimated engine exhaust emissions, along with the estimated/measured values of exhaust AM and catalyst flange temperature, into a physics-based catalyst model, such as TWC model 270 of FIG. 2B. As discussed above with reference to FIG. 2B, based on the values of these input parameters, the catalyst model estimates and outputs the FOS of the catalyst, among other outputs. Following 314, method 300 ends.

Turning now to FIG. 4A, plot 402 displays a characteristic curve of the relationship between the steady state FOS of a catalyst, such as TWC 70 of FIG. 1, and the exhaust AFR. The X-axis represents the exhaust AFR, $\lambda$, as measured by the UEGO sensor; a $\lambda$ value of 1 occurs during stoichiometric engine operation. The Y-axis represents the steady state FOS of the catalyst. A lean feed (e.g., exhaust gas having a lean AFR) may saturate the catalyst, resulting in a FOS closer to 1. Conversely, a rich feed (e.g., exhaust gas having a rich AFR) may deplete the catalyst of stored oxygen, resulting in a FOS closer to 0. Accordingly, the steady state FOS of the catalyst is a nonlinear function of the exhaust AFR.

Plot 404 of FIG. 4B demonstrates a characteristic curve of the relationship between HEGO sensor voltage and exhaust AFR. The X-axis represents the relative exhaust AFR, $\lambda$, as measured by the UEGO sensor. The Y-axis represents the HEGO sensor output voltage. As noted above, the output voltage of the HEGO sensor is a nonlinear function of the amount of oxygen present in the exhaust; a lean feed ($\lambda > 1$) results in a relatively low HEGO sensor voltage, whereas a rich feed ($\lambda < 1$) results in a relatively high HEGO sensor voltage. For example, when the catalyst is saturated with oxygen by a feed of lean exhaust gas, more oxygen will pass through the catalyst as it cannot be stored at the catalyst, resulting in a relatively low HEGO sensor voltage. In contrast, when the catalyst is not saturated with oxygen, due to a feed of rich exhaust gas, oxygen is stored at the catalyst and thus depleted from the exhaust gas, resulting in a relatively high HEGO sensor voltage. As shown, a HEGO sensor voltage jump occurs at approximately $\lambda=1$; when $\lambda$ decreases from approximately 1, the HEGO sensor output increases quickly (e.g., the slope of plot 404 has a first, larger value until reaching a threshold voltage, and then increases less quickly (e.g., the slope of plot 404 has a second, smaller value) as $\lambda$ continues to decrease. On the other hand, when $\lambda$ increases from approximately 1, the HEGO sensor output decreases slowly (e.g., the slope of plot 404 has a third, smallest value). Thus, the HEGO sensor does not provide a linear measurement of exhaust AFR, but rather indicates whether the exhaust AFR is rich or lean. For example, the controller may indicate that the exhaust AFR is rich if the HEGO sensor output voltage is above a first threshold (e.g., the threshold voltage at which the slope of the signal decreases from the first, larger value to the second, smaller value), and that the exhaust AFR is lean if the HEGO sensor output voltage is below a second threshold lower than the first threshold.

Together, FIGS. 4A and 4B show how both the steady state FOS of the catalyst and the HEGO sensor output voltage vary with the exhaust AFR. Further, the steady state FOS of the catalyst and the HEGO sensor output voltage have an inverse relationship (e.g., when one increases, the other decreases). For example, as $\lambda$ transitions from rich to lean, the steady state FOS increases rapidly, while the HEGO sensor output voltage decreases rapidly.

Turning now to FIG. 5, a non-intrusive method 500 for determining fault in a HEGO sensor, which may be executed by a controller such as controller 12 of FIG. 1, is illustrated. This method utilizes the inverse relationship between the rate of change of the FOS of the catalyst and the rate of change of the HEGO sensor output voltage, which occurs during proper functioning of the HEGO sensor, in order to detect whether the HEGO sensor is functioning properly.

Method 500 begins at 502 and the controller estimates or measures the engine operating conditions (e.g., RPM, engine load, and AFR). The engine operating conditions may be measured by one or more sensors such as those described above, or may be estimated or inferred based on available data.

At 504, the controller determines if the engine is operating at steady state and warmed up. For example, it may be determined that the engine is operating in steady state if the engine speed remains substantially constant for at least a threshold duration. Further, it may be determined that the engine is warmed up if the engine temperature is greater than a threshold temperature (e.g., as inferred based on a signal from an ECT sensor such as temperature sensor 112 of FIG. 1).

If the engine is not operating at steady state and warmed up, the method proceeds to 528 and the controller determines whether the engine is warmed up and the state of charge (SOC) of the vehicle battery is greater than a threshold. For example, when the engine is not operating at steady state, transient conditions may be present (e.g., due to the vehicle operator pressing the accelerator pedal and thus causing a sharp increase in engine load). In a hybrid vehicle, the battery and motor/generator may be operatively coupled with the engine crankshaft and the transmission. For example, during conditions where requested vehicle wheel torque is above a threshold, the battery may supply electrical energy to the motor/generator (acting as a motor), and the motor may provide supplemental torque to the vehicle wheels via the transmission. However, the supplemental torque may only be provided if the SOC of the battery is sufficient. In contrast, during conditions such as decelerating where requested vehicle wheel torque is below a threshold, engine output may be converted to electrical energy via the motor/generator (acting as a generator), which is then stored in the battery, such that the torque supplied to the vehicle wheels is less than the engine output torque.

If the answer at 528 is yes, the method proceeds to 530 and the controller adjusts operation of the engine system so that the engine may be operated in steady state while the desired vehicle wheel torque is still provided. For example, if the transient condition is an acceleration condition, the engine load may be decreased to a steady state load, and the required increase in vehicle wheel torque may be supplied by the battery and motor/generator. As another example, if the transient condition is a deceleration condition, the engine load may be increased to a steady state load, and the engine output torque in excess of the requested vehicle wheel torque may be used to generate electricity at the motor/generator for storage at the battery (and thus not applied to the vehicle wheels). After 530, the method proceeds to 508, which will be discussed below.

Otherwise, if the answer at 528 is no, the method proceeds to 506 and the controller maintains current engine operation. For example, if the most recently performed diagnosis of the HEGO sensor indicated no fault, maintaining current engine operation may include continuing to incorporate feedback from the HEGO sensor in the control of the engine AFR. Alternatively, if the most recently performed diagnosis of the HEGO sensor indicated a fault, maintaining current engine operation may include the controller continuing to control the engine AFR without feedback from the HEGO sensor (e.g., controlling the engine AFR with feedback from the UEGO sensor alone). Following 506, method 500 ends.

Returning to 504, if the engine is operating at steady state and warmed up, method 500 proceeds to 508. Further, the method proceeds to 508 after 530. At 508, the controller calculates the FOS of the catalyst and determines the HEGO sensor output voltage at a first time. For example, the FOS may be calculated at the controller using physics-based models of the engine and the TWC stored in non-transitory memory, in the manner described above with reference to FIG. 3. The HEGO sensor output voltage is measured by a HEGO sensor, such as HEGO sensor 128 of FIG. 1, and sent as a signal to a controller, such as controller 12 of FIG. 1. After 508, the method proceeds to 510.

At 510, the controller calculates the catalyst FOS and determines the HEGO sensor output voltage at a second, later time (e.g., the second time occurs chronologically after the first time). The method then proceeds to 512.

At 512, the controller determines the rate of change of the FOS of the catalyst ($\Delta$FOS) and the rate of change of the HEGO sensor output voltage ($\Delta$HEGO) using the values determined at 508 and 510. $\Delta$FOS represents the difference between the catalyst FOS value at the first time and the catalyst FOS value at the second, later time, and thus represents the rate of change of the FOS over a duration which starts at the first time and ends at the second time. Likewise, $\Delta$HEGO represents the difference between the HEGO sensor output voltage at the first time and the HEGO sensor output voltage at the second, later time, and thus represents the rate of change of the HEGO sensor output voltage over the duration which starts at the first time and ends at the second time. That is, $\Delta$FOS and $\Delta$HEGO are determined over a common, specific time period, and thus represent rates of change of the FOS and HEGO sensor output which occur simultaneously. Measuring $\Delta$FOS and ΔHEGO simultaneously, over the exact same time period, is important because the relationship between the rates of change over the same time period (specifically, whether each rate of change is positive or negative over the same time period) is the basis for the fault diagnosis. In one example, the units of the quantity ΔFOS are inverse seconds (1/s), as FOS may be represented by an integer (dimensionless parameter) and the rate of change of FOS occurs over time. Further, in one example, the units of the quantity ΔHEGO are volts per second (V/s). Accordingly, the units of the ratio of ΔFOS to ΔHEGO may be inverse volts (1/V). After 512, the method proceeds to 514.

At 514, the controller determines whether ΔFOS or ΔHEGO is equal to 0. If either ΔFOS or ΔHEGO is equal to 0, the method proceeds to 506 and the controller maintains current engine operation, as described above. Otherwise, if ΔFOS and ΔHEGO are both non-zero, the method proceeds to 516.

At 516, the controller calculates the ratio of ΔFOS to ΔHEGO. Because ΔHEGO is a non-zero value, as required to proceed from 514 to 516, the ratio will be defined. Furthermore, because ΔFOS is a non-zero value, the ratio of ΔFOS to ΔHEGO will also be a non-zero value. After 516, the method progresses to 518.

At 518, the controller determines whether the sign of the ΔFOS to ΔHEGO ratio is positive and higher than a threshold. The threshold may be a predetermined small positive value which is specified to reduce noise and reduce false positive determinations of HEGO sensor fault which may otherwise occur during transient fluctuations. In other examples, however, the threshold may be 0. If the sign of the ΔFOS to ΔHEGO ratio is positive and higher than the threshold, the method proceeds to 520, and the controller indicates a HEGO sensor fault. The indication of a HEGO sensor fault may include the controller setting (e.g., setting to 1) a diagnostic flag corresponding to the HEGO sensor, where the setting of the flag indicates a fault condition of the HEGO sensor. The indication of a HEGO sensor fault may further include the controller sending a signal to a display of the vehicle to display a message requesting the vehicle operator to service the emission system or otherwise indicate to the vehicle operator that the emission system requires servicing, for example. The method then proceeds to 522.

At 522, the controller regulates the AFR without HEGO sensor input. For example, the controller may transition from performing closed-loop AFR control based on feedback from the HEGO sensor as well as the UEGO sensor to closed-loop AFR control in a feed-forward mode with UEGO sensor feedback but without HEGO sensor feedback, as described above with reference to FIG. 2. For example, with reference to the control architecture shown in FIG. 2, regulating the AFR without HEGO sensor input may include using an inner feedback control loop without input from the outer feedback control loop. In another example, if a UEGO sensor fault is indicated in addition to HEGO sensor fault, the AFR may be maintained in a feed-forward mode using an estimated cylinder mass air charge and fuel amount, without correction from either UEGO sensor feedback or HEGO sensor feedback. However, such operation may negatively affect the ability of the vehicle to meet emissions requirements. Following 522, method 500 ends.

Returning to 518, if the sign of the ratio of ΔFOS to ΔHEGO is not positive (and thus has a negative value, as it is not equal to 0), method 500 proceeds to 524, and the controller indicates that there is no HEGO sensor fault (e.g., the HEGO sensor is working properly). The indication of no HEGO sensor fault may include the controller clearing (e.g., setting to 0) a diagnostic flag corresponding to the HEGO sensor, where the clearing of the flag indicates that a fault condition of the HEGO sensor is not occurring. After 524, the method progresses to 526.

At 526, the controller regulates the AFR using feedback from the HEGO sensor. For example, the AFR may continue to be regulated according to the catalyst control architecture described with reference to FIG. 2, including both the inner and outer feedback control loops, and thus no adjustments to the AFR control strategy may be performed. In addition to feedback from the HEGO sensor, feedback from the UEGO sensor or an estimated exhaust AFR upstream of the TWC may also factor into the AFR control. The control strategy may be a default, nominal control strategy which provides optimal AFR control but requires both the UEGO sensor and HEGO sensor to be functioning properly. Following 526, method 500 ends.

In this way, the HEGO sensor can be diagnosed based on the sign of the ratio of ΔFOS to ΔHEGO alone (e.g., whether the ratio is positive or negative), and thus independent of the magnitudes of the ΔFOS and ΔHEGO. For example, if the catalyst is saturated with oxygen from a lean feed, the FOS of the catalyst will increase as exhaust gas flows through the catalyst, such that ΔFOS has a positive value. Meanwhile, the HEGO sensor output voltage will decrease, such that ΔHEGO has a negative value. Conversely, if the oxygen stored by the catalyst is depleted from a rich feed, the FOS of the catalyst will decrease as exhaust gas flows through the catalyst (resulting in a negative ΔFOS value), whereas the HEGO sensor output voltage will increase (resulting in a positive ΔHEGO value). Thus, during nominal operation of the HEGO sensor, the ratio of ΔFOS to ΔHEGO results in a negative value. A fault condition of the HEGO sensor is indicated if the ratio of ΔFOS to ΔHEGO is positive and higher than a threshold. Only the inventors have recognized that although the magnitude of ΔFOS and ΔHEGO may vary, e.g. based on exhaust gas temperature and flow rate, the sign of the ratio of these quantities, in and of itself, may reliably indicate whether the HEGO sensor is in a fault condition. Optionally, whether or not the magnitude of the ratio of ΔFOS to ΔHEGO exceeds a predetermined positive threshold may be considered, for the purpose of avoiding false positive determinations which may occur due to small fluctuations of the ratio. Further, advantageously, the HEGO sensor may be diagnosed even during transient operating conditions when the method is performed in the context of a hybrid vehicle, as the battery and motor/generator may add or remove torque as needed to allow the engine to operate in steady state while still supplying requested torque to vehicle wheels.

Turning now to FIG. 6, map 600 displays a first example timing diagram illustrating HEGO sensor diagnosis according to method 500 of FIG. 5. Map 600 shows the commanded AFR (λ) at plot 602, the estimated AFR at plot 604, the UEGO sensor output voltage at plot 606, the state of a UEGO sensor fault flag at plot 608, the HEGO sensor output voltage at plot 610, the FOS of the catalyst at plot 612, the ratio of ΔFOS to ΔHEGO at plot 614, and the state of a HEGO sensor fault flag at plot 616. Additionally, a threshold for indicating HEGO sensor fault is represented by dashed line 618. For all of the above, the X-axis represents time, with time increasing along the X-axis from left to right. The Y-axis of each individual graph corresponds to the labeled parameter and increases from bottom to top with the exception of plots 608 and 616, in which the Y-axis reflects whether a sensor fault flag is "on" (indicating degradation) or "off" (no degradation indicated).

Between t0 and t1, an engine system of a vehicle is operated with a commanded AFR at stoichiometry such that λ=1, as shown in plot 602. The UEGO sensor measures the actual AFR upstream of the TWC and may display voltage fluctuations about stoichiometry as the fuel command is adjusted based on sensor feedback (plot 606), as described herein with reference to FIG. 2. For example, if the UEGO sensor output indicates that the AFR is rich, the controller may decrease the fuel pulse width accordingly in order to achieve a stoichiometric AFR. In the example illustrated by map 600, the UEGO sensor is functioning properly (e.g., it does not display any of the six-pattern faults). As a result, the UEGO sensor fault flag (plot 608) is off, and the estimated engine AFR, shown in plot 604, is determined using the UEGO sensor reading. Meanwhile, the HEGO sensor, downstream of the catalyst, measures the post-catalyst AFR (e.g., the AFR at the tailpipe). As shown at plot 610, the HEGO sensor output voltage fluctuates slightly as the AFR is maintained at stoichiometry. Likewise, the calculated FOS of the catalyst (plot 612) experiences slight fluctuations as the AFR is maintained at stoichiometry.

A controller, such as controller 12 of FIG. 1, determines the ratio of ΔFOS to ΔHEGO (plot 614), as described herein with reference to FIG. 5. In the example shown in map 600 of FIG. 6, the ratio of ΔFOS to ΔHEGO is monitored continuously. Alternatively, the ratio of ΔFOS to ΔHEGO may be calculated periodically. For example, the ratio of ΔFOS to ΔHEGO may be determined after a predetermined duration of engine operation. In another example, determination of the ratio of ΔFOS to ΔHEGO may be triggered by a change in engine operating conditions (e.g., RPM, engine load, or AFR). Between t0 and t1, the ratio of ΔFOS to ΔHEGO is negative. Therefore, the HEGO sensor fault flag is off during this time, as shown in plot 616.

At t1, the commanded AFR (plot 602) is stepped to lean. For example, the commanded AFR may switch to lean during vehicle deceleration or during light-load cruise conditions. Between t1 and t2, the UEGO sensor output voltage (plot 606) increases in response to the increased oxygen concentration in the air-fuel mixture. The UEGO sensor fault flag 608 remains off, indicating that a UEGO sensor fault has not been detected. Further, between t1 and t2, the FOS of the catalyst (plot 612) increases as more oxygen is available in the feed gas for the catalyst to store, and the catalyst approaches saturation (e.g., the FOS value approaches 1). This results in more oxygen passing through the catalyst and a corresponding drop in HEGO sensor output voltage 610. The ratio of ΔFOS to ΔHEGO remains negative, as shown in plot 614, due to the inverse relationship between the FOS of the catalyst and HEGO sensor output voltage. Because the ratio is negative, the HEGO sensor fault flag is not set and remains off (plot 616).

Beginning at t2, λ (plot 602) is stepped from lean to rich. For example, the AFR may be stepped to rich during vehicle acceleration or during high-load conditions. As the amount of air (and therefore oxygen) in the feedgas decreases, the UEGO sensor output voltage (plot 606) and the estimated AFR (plot 604) also decrease. The UEGO sensor fault flag 608 remains off. The FOS of the catalyst (plot 612) decreases as oxygen stores are depleted in order to oxidize exhaust gas species such as CO and HC; this allows an increasing amount of oxygen to be stored at the catalyst. As a result, the downstream HEGO sensor output voltage 610 increases as the oxygen concentration of the tailpipe emissions decreases. Again, the ratio of ΔFOS to ΔHEGO remains negative (plot 614), and HEGO sensor fault is not indicated (plot 616).

At t3, the commanded AFR is returned to stoichiometry (plot 602). Between t3 and t4, the behavior of the UEGO sensor output voltage, HEGO sensor output voltage, and FOS of the catalyst is similar to the behavior exhibited between t0 and t1. For example, the UEGO sensor output voltage 606 oscillates about stoichiometry, and the HEGO sensor output voltage 610 and FOS of the catalyst 612 each remain relatively constant with slight fluctuations. The ratio of ΔFOS to ΔHEGO remains negative (plot 614), and HEGO sensor fault is not indicated (plot 616).

At t4, λ is again stepped to lean (plot 602). Between t4 and t5, the UEGO sensor output voltage 606, estimated AFR 604, and FOS of the catalyst 612 increase in response to the change in λ, as described above in reference to t1. However, as shown, the HEGO sensor output voltage 610 also increases. When the HEGO sensor is functioning properly and thus is not experiencing a fault, the HEGO sensor output voltage decreases in response to an increase in oxygen in the exhaust gas (e.g., as it did between t1 and t2). In contrast, if HEGO sensor output voltage increases as the oxygen concentration of the exhaust gas increases, the HEGO sensor is degraded and not functioning properly. Degradation of the HEGO sensor which would result in such behavior may include increased diffusion barrier due to buildup of soot on the ceramic element and catalyst depletion. As shown in plot 614, due to the simultaneous increase in the HEGO sensor output voltage and FOS, the slope of the HEGO sensor output voltage signal and the slope of the estimated FOS signal are both positive, and thus the ratio of ΔFOS to ΔHEGO becomes positive. At t5, the ratio exceeds threshold 618. As a result, at t5, the HEGO sensor fault flag 614 is set to on, indicating HEGO sensor degradation. Along with providing an indication of HEGO sensor fault, the controller may adjust the AFR control logic upon identifying that the HEGO sensor is degraded, for example in the manner described herein with reference to FIG. 5.

At t6, λ, is again stepped from lean to rich (plot 602). The UEGO sensor output voltage 606, estimated AFR 604, and FOS of the catalyst 612 decrease accordingly, as described above in reference to t2. However, the HEGO sensor output voltage 610 also decreases. A decrease in HEGO sensor output voltage as the richness of the AFR increases results in a positive value for the ratio of ΔFOS to ΔHEGO (plot 614). Therefore, the ratio of ΔFOS to ΔHEGO remains above threshold 618, and the HEGO sensor fault flag 616 remains on.

Turning to FIG. 7, a second example timing diagram illustrating HEGO sensor diagnosis in accordance with method 500 of FIG. 5 is shown. Map 700 of FIG. 7 displays the same parameters as map 600 of FIG. 6 (e.g., plot 702 of FIG. 7 corresponds to plot 602 of FIG. 6) but for a second operating condition during which the UEGO sensor is degraded.

As described above with reference to FIG. 6, between t0 and t1, an engine system of a vehicle is operated with a commanded λ at stoichiometry (plot 702). In the example of FIG. 7, a diagnosis of the UEGO sensor (e.g., via a six-pattern fault detection method) was performed prior to t0 and a fault was detected; as shown, the UEGO sensor output voltage 706 demonstrates a lag in sensor response. Accordingly, the UEGO sensor fault flag is set to on (plot 708). In contrast to the estimated AFR 604 shown in FIG. 6, which is estimated based on the output of the UEGO sensor, among other factors, the estimated AFR shown in plot 704 is independent of UEGO sensor output, and instead is estimated based on measured or inferred engine operating conditions such as cylinder air amount and the amount of fuel injected, as described herein with reference to FIG. 3. The FOS of the catalyst may be determined using this estimated AFR during the fault condition of the UEGO sensor, as also described with reference to FIG. 3.

Prior to t4, the HEGO sensor output voltage 710 and FOS of the catalyst 712 respond appropriately to changes in λ, as described above with reference to FIG. 6. For example, as λ increases, the FOS of the catalyst 712 increases, and the HEGO sensor output voltage 710 decreases. Thus, the ratio of ΔFOS to ΔHEGO is negative (plot 714), and HEGO sensor fault is not indicated (plot 716). However, beginning at t4, the HEGO sensor output voltage increases as λ increases, and thus the ratio of ΔFOS to ΔHEGO has a positive value. At t5, the ratio of ΔFOS to ΔHEGO exceeds threshold 718. As a result, the HEGO sensor fault flag 716 is set to on and remains on while the ratio of ΔFOS to ΔHEGO remains positive and higher than threshold 718.

Along with providing an indication of the HEGO sensor fault, the controller may adjust the AFR control logic in response to the detection of the HEGO sensor fault. In the example of FIG. 7, the UEGO sensor is also degraded, and thus, the AFR may be regulated independent of UEGO sensor feedback as well as independent of HEGO sensor feedback. For example, fail safe open-loop or feed-forward control of the AFR may be performed by the controller.

In the examples shown by maps 600 and 700, the HEGO sensor fault occurs suddenly. It will be appreciated that these examples are illustrative and in other examples, HEGO sensor fault may occur gradually, or may be evident as soon as the engine has reached warmed up steady state operation following a key-on event.

In accordance with the present disclosure, an engine method includes determining a rate of change of a fractional oxidation state (FOS) of an exhaust catalyst and a rate of change of an output voltage of an oxygen sensor arranged downstream of the catalyst; and if a ratio of the rate of change of the FOS to the rate of change of the output voltage is positive, indicating an oxygen sensor fault and controlling engine operation independent of the oxygen sensor output voltage. In a first example of the method, determining the rate of change of the FOS over the duration comprises determining a first FOS at a first time and a second FOS at a second time, and determining each of the first FOS and the second FOS via physics-based engine and catalyst models. A second example of the method optionally includes the first example and further includes determining each of the first FOS and the second FOS via physics-based engine and catalyst models by inputting an exhaust air-fuel ratio sensed upstream of the catalyst into the engine model, estimating engine exhaust emissions with the engine model as a function of the sensed exhaust air-fuel ratio, inputting the estimated engine exhaust emissions into the catalyst model, and estimating the FOS with the catalyst model as a function of the estimated engine exhaust emissions. A third example of the method optionally includes one or more of the first and second examples, and further includes inputting engine coolant temperature and engine speed into the engine model and inputting exhaust air mass and catalyst temperature into the catalyst model, wherein the estimated engine exhaust emissions are further a function the engine coolant temperature and engine speed, and wherein the estimated FOS is further a function of the exhaust air mass and catalyst temperature. A fourth example of the method optionally includes one or more of the first through third examples, and further includes that the oxygen sensor is a first oxygen sensor, wherein the engine further comprises a second oxygen sensor arranged in the exhaust upstream of the catalyst, and wherein controlling engine operation independent of the sensor output comprises adjusting an amount of fuel injected to the engine in response to feedback from the second oxygen sensor. A fifth example of the method optionally includes one or more of the first through fourth examples, and further includes that the sensor is a first oxygen sensor, wherein the engine further comprises a second oxygen sensor arranged in the exhaust upstream of the catalyst, and wherein controlling engine operation independent of the sensor output comprises: determining whether the second oxygen sensor is in a fault condition; if the second sensor is in a fault condition, performing feed-forward control of engine air-fuel ratio independent of the outputs of the first and second oxygen sensors; and if the second sensor is not in a fault condition, performing feed-back control of engine air-fuel ratio dependent on the output of the second oxygen sensor and independent of the output of the first oxygen sensor. A sixth example of the method optionally includes one or more of the first through fifth examples, and further includes, if the ratio of the rate of change of the FOS to the rate of change of the output voltage of the oxygen sensor is negative, indicating no sensor fault and controlling engine operation in dependence on the output voltage of the oxygen sensor. A seventh example of the method optionally includes one or more of the first through sixth examples, and further includes that the ratio of the rate of change of the FOS to the rate of change of the output voltage is a ratio of the rate of change of the FOS between a specific first time and a specific second time to the rate of change of the output voltage between the specific first time and the specific second time.

Further, in accordance with the present disclosure, and engine system includes a three-way catalyst arranged in an engine exhaust passage; a heated exhaust gas oxygen (HEGO) sensor arranged downstream of the catalyst in the exhaust passage; a controller including non-transitory memory with instructions stored therein which are executable by a processor to: estimate engine exhaust emissions; determine a fractional oxidation state (FOS) of the catalyst as a function of the estimated engine exhaust emissions; monitor a ratio of a rate of change of the FOS over a specified time period to a rate of change of an output voltage of the HEGO sensor over the specified time period; and if the ratio is positive and greater than a threshold, indicate HEGO sensor degradation and adjust engine air-fuel ratio independent of feedback from the HEGO sensor. In a first example of the engine system, the non-transitory memory has a physics-based engine model and a physics-based catalyst model stored therein. A second example of the engine system optionally includes the first example and further includes that the engine model is configured to receive as an input an estimated exhaust air-fuel ratio and output the estimated engine exhaust emissions, and wherein the catalyst model is configured to receive as an input the estimated engine exhaust emissions and output the FOS of the catalyst. A third example of the engine system optionally includes one or more of the first and second examples, and further includes a universal exhaust gas oxygen (UEGO) sensor arranged upstream of the catalyst in the exhaust passage, wherein when the UEGO sensor is not in a fault condition, the estimated exhaust air-fuel ratio is estimated as a function of an output voltage of the UEGO sensor. A fourth example of the engine system optionally includes one or more of the first through third examples, and further includes that when the UEGO sensor is in a fault condition, the estimated exhaust air-fuel ratio is estimated as a function of mass air flow to the engine and an amount of fuel injected to the engine and then filtered and/or averaged, and wherein the filtered and/or averaged estimated exhaust air-fuel ratio is received as an input to the engine model. A fifth example of the engine system optionally includes one or more of the first through fourth examples, and further includes that the engine model is further configured to receive as inputs engine speed and engine coolant temperature, and wherein the catalyst model is further configured to receive as inputs a mass air flow in the exhaust passage and a catalyst flange temperature. A sixth example of the engine system optionally includes one or more of the first through fifth examples, and further includes that the controller further comprises instructions stored in the non-transitory memory which are executable by a processor to: if the ratio is less than the threshold, indicate no HEGO sensor degradation and adjust engine air-fuel ratio in dependence on feedback from the HEGO sensor and further in dependence on an estimated exhaust air-fuel ratio upstream of the catalyst.

Furthermore, in accordance with the present disclosure, a hybrid vehicle includes a powertrain comprising an engine, a motor/generator, a battery, and a transmission coupled to vehicle wheels; a three-way catalyst arranged in an engine exhaust passage; a heated exhaust gas oxygen (HEGO) sensor arranged downstream of the catalyst in the exhaust passage; a controller including non-transitory memory with instructions stored therein which are executable by a processor to: initiate a fault diagnosis of the HEGO sensor, the fault diagnosis including estimating engine exhaust emissions, determine a fractional oxidation state (FOS) of the catalyst as a function of the estimated engine exhaust emissions, monitoring a ratio of a rate of change of the FOS to a rate of change of an output voltage of the HEGO sensor, and if the ratio is positive, indicating a HEGO sensor fault; and maintain steady-state engine operation during the diagnosis by selectively adding or removing torque with the battery and motor/generator during transient conditions. In a first example of the hybrid vehicle, the fault diagnosis further includes, if the ratio is positive, adjusting engine air-fuel ratio independent of feedback from the HEGO sensor, and if the ratio is not positive, indicating no HEGO sensor fault and adjusting engine air-fuel ratio dependent on feedback from the HEGO sensor. A second example of the hybrid vehicle optionally includes the first example and further includes that neither the magnitude of the rate of change of the FOS nor the magnitude of the rate of change of the output voltage of the HEGO sensor factors into the diagnosis of the HEGO sensor. A third example of the hybrid vehicle optionally includes one or more of the first and second examples, and further includes that the non-transitory memory has a physics-based engine model and a physics-based catalyst model stored therein, wherein the engine model is configured to receive as an input an estimated exhaust air-fuel ratio and output the estimated engine exhaust emissions, and wherein the catalyst model is configured to receive as an input the estimated engine exhaust emissions and output the FOS of the catalyst. A fourth example of the hybrid vehicle optionally includes one or more of the first through third examples, and further includes a universal exhaust gas oxygen (UEGO) sensor arranged upstream of the catalyst in the exhaust passage, wherein when the UEGO sensor is not in a fault condition, the estimated exhaust air-fuel ratio is estimated as a function of an output voltage of the UEGO sensor.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein. The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
   determining a rate of change of a fractional oxidation state (FOS) of an exhaust catalyst and a rate of change of an output voltage of an oxygen sensor arranged downstream of the catalyst via a controller including non-transitory memory with instructions stored therein which are executable by a processor;
   if a ratio of the rate of change of the FOS to the rate of change of the output voltage is positive, indicating an oxygen sensor fault and controlling engine operation independent of the oxygen sensor output voltage via the controller.

2. The method of claim 1, wherein the oxygen sensor is a first oxygen sensor, wherein the engine further comprises a second oxygen sensor arranged in the exhaust upstream of the catalyst, and wherein controlling engine operation independent of the sensor output comprises adjusting an amount of fuel injected to the engine in response to feedback from the second oxygen sensor.

3. The method of claim 1, wherein the sensor is a first oxygen sensor, wherein the engine further comprises a second oxygen sensor arranged in the exhaust upstream of the catalyst, and wherein controlling engine operation independent of the sensor output comprises:
determining whether the second oxygen sensor is in a fault condition;
if the second sensor is in a fault condition, performing feed-forward control of engine air-fuel ratio independent of the outputs of the first and second oxygen sensors;
if the second sensor is not in a fault condition, performing feedback control of engine air-fuel ratio dependent on the output of the second oxygen sensor and independent of the output of the first oxygen sensor.

4. The method of claim 1, further comprising:
if the ratio of the rate of change of the FOS to the rate of change of the output voltage of the oxygen sensor is negative, indicating no sensor fault and controlling engine operation in dependence on the output voltage of the oxygen sensor.

5. The method of claim 1, wherein the ratio of the rate of change of the FOS to the rate of change of the output voltage is a ratio of the rate of change of the FOS between a specific first time and a specific second time to the rate of change of the output voltage between the specific first time and the specific second time.

6. The method of claim 1, wherein determining the rate of change of the FOS comprises determining a first FOS at a first time and a second FOS at a second time, and determining each of the first FOS and the second FOS via physics-based engine and catalyst models stored within the non-transitory memory.

7. The method of claim 6, wherein determining each of the first FOS and the second FOS via physics-based engine and catalyst models comprises inputting an exhaust air-fuel ratio sensed upstream of the catalyst into the engine model, estimating engine exhaust emissions with the engine model as a function of the sensed exhaust air-fuel ratio, inputting the estimated engine exhaust emissions into the catalyst model, and estimating the FOS with the catalyst model as a function of the estimated engine exhaust emissions.

8. The method of claim 7, further comprising inputting engine coolant temperature and engine speed into the engine model and inputting exhaust air mass and catalyst temperature into the catalyst model, wherein the estimated engine exhaust emissions are further a function of the engine coolant temperature and engine speed, and wherein the estimated FOS is further a function of the exhaust air mass and catalyst temperature.

9. An engine system, comprising:
a three-way catalyst arranged in an engine exhaust passage;
a heated exhaust gas oxygen (HEGO) sensor arranged downstream of the catalyst in the exhaust passage;
a controller including non-transitory memory with instructions stored therein which are executable by a processor to:
estimate engine exhaust emissions;
determine a fractional oxidation state (FOS) of the catalyst as a function of the estimated engine exhaust emissions;
monitor a ratio of a rate of change of the FOS over a specified time period to a rate of change of an output voltage of the HEGO sensor over the specified time period;
if the ratio is positive and greater than a threshold, indicate HEGO sensor degradation and adjust engine air-fuel ratio independent of feedback from the HEGO sensor.

10. The engine system of claim 9, wherein the controller further comprises instructions stored in the non-transitory memory which are executable by a processor to:
if the ratio is less than the threshold, indicate no HEGO sensor degradation and adjust engine air-fuel ratio in dependence on feedback from the HEGO sensor and further in dependence on an estimated exhaust air-fuel ratio upstream of the catalyst.

11. The engine system of claim 9, wherein the non-transitory memory has a physics-based engine model and a physics-based catalyst model stored therein.

12. The engine system of claim 11, wherein the engine model is configured to receive as an input an estimated exhaust air-fuel ratio and output the estimated engine exhaust emissions, and wherein the catalyst model is configured to receive as an input the estimated engine exhaust emissions and output the FOS of the catalyst.

13. The engine system of claim 12, wherein the engine model is further configured to receive as inputs engine speed and engine coolant temperature, and wherein the catalyst model is further configured to receive as inputs a mass air flow in the exhaust passage and a catalyst flange temperature.

14. The engine system of claim 11, further comprising a universal exhaust gas oxygen (UEGO) sensor arranged upstream of the catalyst in the exhaust passage, wherein when the UEGO sensor is not in a fault condition, the estimated exhaust air-fuel ratio is estimated as a function of an output voltage of the UEGO sensor.

15. The engine system of claim 14, wherein when the UEGO sensor is in a fault condition, the estimated exhaust air-fuel ratio is estimated as a function of mass air flow to the engine and an amount of fuel injected to the engine and then filtered and/or averaged, and wherein the filtered and/or averaged estimated exhaust air-fuel ratio is received as an input to the engine model.

16. A hybrid vehicle, comprising:
a powertrain comprising an engine, a motor/generator, a battery, and a transmission coupled to vehicle wheels;
a three-way catalyst arranged in an engine exhaust passage;
a heated exhaust gas oxygen (HEGO) sensor arranged downstream of the catalyst in the exhaust passage;
a controller including non-transitory memory with instructions stored therein which are executable by a processor to:
initiate a fault diagnosis of the HEGO sensor, the fault diagnosis including estimating engine exhaust emissions, determine a fractional oxidation state (FOS) of the catalyst as a function of the estimated engine exhaust emissions, monitoring a ratio of a rate of change of the FOS to a rate of change of an output voltage of the HEGO sensor, and if the ratio is positive, indicating a HEGO sensor fault; and
maintain steady-state engine operation during the diagnosis by selectively adding or removing torque with the battery and motor/generator during transient conditions.

17. The hybrid vehicle of claim 16, wherein the fault diagnosis further includes, if the ratio is positive, adjusting engine air-fuel ratio independent of feedback from the HEGO sensor, and if the ratio is not positive, indicating no HEGO sensor fault and adjusting engine air-fuel ratio dependent on feedback from the HEGO sensor.

18. The hybrid vehicle of claim 16, wherein neither the magnitude of the rate of change of the FOS nor the magnitude of the rate of change of the output voltage of the HEGO sensor factors into the diagnosis of the HEGO sensor.

19. The hybrid vehicle of claim 16, wherein the non-transitory memory has a physics-based engine model and a physics-based catalyst model stored therein, wherein the engine model is configured to receive as an input an estimated exhaust air-fuel ratio and output the estimated engine exhaust emissions, and wherein the catalyst model is configured to receive as an input the estimated engine exhaust emissions and output the FOS of the catalyst.

20. The hybrid vehicle of claim 19, further comprising a universal exhaust gas oxygen (UEGO) sensor arranged upstream of the catalyst in the exhaust passage, wherein when the UEGO sensor is not in a fault condition, the estimated exhaust air-fuel ratio is estimated as a function of an output voltage of the UEGO sensor.

* * * * *